United States Patent [19]
Parkhurst et al.

[11] Patent Number: 5,642,474
[45] Date of Patent: Jun. 24, 1997

[54] ARBITRARY MASKING TECHNIQUE FOR FILLING IN SHAPES FOR DISPLAY

[75] Inventors: Anthony D. Parkhurst, Oceanside; Padmanabhan Ramchandran, San Diego, both of Calif.

[73] Assignee: Hewlett-Packard Company, Palo Alto, Calif.

[21] Appl. No.: 399,403

[22] Filed: Mar. 6, 1995

[51] Int. Cl.$^6$ .................................................. G06K 15/00
[52] U.S. Cl. ........................................... 395/117; 395/134
[58] Field of Search ....................... 395/112, 114, 395/115, 116, 117, 135, 134, 130, 129, 131, 170, 522, 523, 524; 382/203, 212, 282, 283

[56] References Cited

U.S. PATENT DOCUMENTS

| | | | |
|---|---|---|---|
| 4,992,956 | 2/1991 | Kaku et al. | 395/117 |
| 5,003,496 | 3/1991 | Hunt, Jr. et al. | 395/117 |
| 5,249,061 | 9/1993 | Nagashima et al. | 358/296 |

FOREIGN PATENT DOCUMENTS

| | | | |
|---|---|---|---|
| 0476533A2 | 3/1992 | European Pat. Off. | G06F 15/72 |
| WO91/08548 | 6/1991 | WIPO | G06F 15/72 |
| WO92/01269 | 1/1992 | WIPO | G06K 15/02 |

OTHER PUBLICATIONS

Anthony D. Parkhurst et al., "Connectivity of the HP Deskjet 1200C Printer," Hewlett–Packard Journal, Feb. 1994, USA, vol. 45, No. 1. pp. 85–97.

*Primary Examiner*—Arthur G. Evans

[57] ABSTRACT

In one embodiment of the invention, the conventional three-step ROP process for filling in arbitrary shapes with a pattern is modified to require less computation and memory. In a preferred embodiment, a printer driver routine installed in the host computer converts the conventional ROP instructions into a modified set of instructions which are then transmitted and processed by the printer. A masking buffer in the printer supports the process. The improved method only requires the fill pattern to be transmitted once to the printer instead of twice, resulting in memory savings of up to 50% and speeding up the print time significantly. In contrast to the three-step ROP process, the first step (ROP 90) of XORing the fill pattern with the destination area is deleted. The arbitrary shapes for being filled are transmitted to the printer, and these shapes are stored in a temporary masking buffer. The fill pattern is then transmitted to the printer and ANDed with the mask so that only the fill pattern coinciding with the area of the mask is forwarded for printing.

25 Claims, 6 Drawing Sheets

ARBITRARY MASKING TECHNIQUE FOR FILLING IN SHAPES FOR DISPLAY

FIELD OF THE INVENTION

This invention relates to graphics processing and in particular to a method for filling in an arbitrary shape with a selected pattern for display.

BACKGROUND OF THE INVENTION

In many types of printers, such as the HP DeskJet 1200C printer, control and display information from the host computer to the printer is provided in a high level page description language and then converted by the printer into a raster scan type format. The printer then applies the data in the raster scan format to the print engine for printing on a medium. Since the printer, and not the host computer, performs the processing of the high level commands, the computer is able to more quickly support the user.

A page to be printed must be first stored in the printer as a display list or stored as individual pixels in a frame buffer. The article, "Connectivity of the HP DeskJet 1200C Printer," by Anthony Parkhurst et al., Hewlett-Packard Journal, February 1994, pages 85-97, describes this well known interface between a host computer and the HP DeskJet 1200C color printer. This article is incorporated herein by reference. Such an interface is similar to the interface used by other printers.

The HP DeskJet 1200C is a color inkjet type printer using a black pen, a cyan pen, a magenta pen, and a yellow pen. Drops of black ink or color ink are emitted by the inkjet printheads to form dots or pixels on the medium. These dots are closely spaced, or overlapping, and the individual dots are indistinguishable from one another. Many colors are created by the various combinations of cyan, magenta, and yellow ink.

The page description language transmitted to the printer describes shapes to be displayed using coordinates and primitives such as rectangles, vectors, circles, or polygons. Text is described by designating characters and fonts rather than describing the appearance of the characters. The page description language also describes operations to be performed on the shapes, such as filling a shape with a particular pattern or color. Such a page description language is in contrast to a simple pixel-by-pixel description, where each pixel to be printed is transmitted to the printer in a raster scan order, although such a transmission in raster scan format is permitted in conjunction with the high level language. One well known page description language is the PCL-5C language, which is described in detail in the Hewlett-Packard publication entitled "PCL 5 Printer Language Technical Reference Manual," Manual Part No. 5961-0509, 1992, incorporated herein by reference. A programmer who is developing a graphics program may use such a PCL-5 language to define the images to be displayed. Other page description languages include PostScript and HP-GL/2, among others.

The amount of memory required in the printer and the time it takes to successfully render and print a page is directly proportional to the complexity of the page description. The memory capacity in the HP DeskJet 1200C is 2 megabytes but is expandable to up to 26 megabytes for more complex graphics.

Graphics application programs for personal computers have made it easy for users to apply fills to text, arbitrary objects, and backdrops. For example, for a gradient fill, the user has to just choose a beginning color, an end color, and the nature of the gradient, such as linear, angular, radial, or conical. Once the gradient is defined, it can be applied to any text or graphics object to fill in the text or object with the gradient pattern previously defined. Many applications dealing with presentation graphics now have full-screen gradients available as standard backdrops.

While graphical user interfaces (GUI), such as a menu driven display used in conjunction with a mouse, have made fills easily available for end users, there is no standard way of internally representing and implementing the fills. This makes it a non-trivial task for the printer drivers (used to interface a particular printer with a variety of application programs in the host computer) and page description languages to support the variety of filling or shading techniques used by the various application programs.

Several prominent software applications involving graphics displays use a three-step raster operation (ROP) process to fill in arbitrarily shaped objects with a solid fill or a patterned fill. A ROP is a logical operation performed on image data. The example of a gradient fill of an arbitrary shape will be used as an illustration in FIG. 1.

FIGS. 1A-1C illustrate a conventional ROP process for creating an oval having a gradient fill. The process creates the gradient fill without changing any portion of the display outside of the boundaries of the arbitrary shape. In FIGS. 1A-1C, it is assumed that the initial background is a color X background 10 which is stored in a display list or frame buffer.

The user creates an arbitrary shape by, for example, drawing an outline of the shape using a mouse in conjunction with a conventional graphics program. This arbitrary shape may also be any object automatically created by the application program. It will be assumed that the arbitrary shape is an oval.

The user next selects the desired fill for the arbitrary shape, which we will assume is a gradient pattern 12 of color Y.

A three-step ROP process is then performed to now fill in the arbitrary shape with the selected fill pattern.

In the first step (FIG. 1A) of this three-step process, the pixels in the background 10 destination area are exclusively ORed (XOR) with the gradient fill pattern 12. This step is designated ROP 90 in the page description language. This will produce an intermediate gradient pattern 14 of color Z in the destination area.

In step two (FIG. 1B), the previously created arbitrary shape is copied as a monochrome mask 16 into the destination area (in either a display list or a frame buffer) to replace the corresponding pixels in the destination area, as illustrated by pattern 18. This copy step is designated ROP 240.

In step three (FIG. 1C), all of the pixels in the destination area pattern 18 are then XORed with the gradient pattern 12 using the ROP 90 instruction again. The result of step three is that the portions outside of the mask 16 will be converted to the original display background 10, while the pixels within the mask 16 will be converted to the gradient pattern 12. The resulting masked gradient pattern 12 is then printed or otherwise displayed.

The above three-step process requires the gradient pattern 12 to be transmitted twice, and requires sufficient memory in the printer to store this gradient pattern twice. If the fill pattern were a complex raster image (e.g., a picture), much more memory would be required to store this image.

It would be desirable to implement a fill process performed by a printer or computer which requires less memory and less complexity than the three-step ROP process described with respect to FIGS. 1A–1C and which is practical and inexpensive to implement.

SUMMARY OF THE INVENTION

In one embodiment of the invention, the conventional three-step ROP process for filling in arbitrary shapes with a pattern is modified to require less computation and memory. In a preferred embodiment, a printer driver routine installed in the host computer converts the conventional ROP instructions into a modified set of instructions which are then transmitted and processed by the printer. A masking buffer in the printer supports the process. The improved method only requires the fill pattern to be transmitted once to the printer instead of twice, resulting in memory savings of up to 50% and speeding up the print time significantly.

In contrast to the three-step ROP process, the first step (ROP 90) of XORing the fill pattern with the destination area is deleted. The arbitrary shapes for being filled are transmitted to the printer, and these shapes (masks) are stored in a temporary masking buffer. The fill pattern is then transmitted to the printer and ANDed with the mask(s) so that only the fill pattern coinciding with the area of the mask(s) is forwarded for printing.

A particular implementation of this method uses the PCL-5C format architecture and is implemented without any application intervention. In a preferred embodiment, the printer driver alters a conventional ROP process so as to operate with existing applications already using such an ROP process. However, the invention may also be implemented directly by the application programs so that no alteration by the printer driver is needed. Displaying the resulting image by other than printing is also contemplated.

DETAILED DESCRIPTION OF THE PREFERRED EMBODIMENTS

The invention will be described in the context of a host computer instructing a printer to display one or more arbitrary shapes having a fill pattern. For illustration purposes, it will be assumed that the applications program (e.g., a graphics program) being run by the host computer uses a conventional three-step ROPs process to fill in arbitrary shapes and that instructions to the printer are transmitted in a high level page description language. The construction of such a system will be described in greater detail with respect to FIG. 4.

In the preferred embodiment, a software package is provided along with the printer and is loaded into the host computer to act as a printer driver. A printer driver is generally used to interface a particular printer with the various data formats expected to be encountered. It is the printer driver which then performs the various conversion steps described below before the printing instructions are transmitted. Certain hardware and software in the printer then performs the various actions described below on the transmitted instructions. In another embodiment, the applications program run by the host computer implements the function of the printer driver directly so that conversion by the printer driver is not necessary.

In the preferred embodiment, the printer instructions are transmitted to the printer in a PCL-5C format. The PCL-5C formatter architecture used by the printer is based on the construction of a display list of objects that are generated by a language parser from the incoming PCL-5C data stream. The parser recognizes commands in the data stream and performs the requested functions. The output of the parser is stored as a display list. The display list keeps growing until the page description is complete and the page closed. The objects and their attributes in the display list need not be created in the top-to-down order these objects appear on a page. The objects in the display list are then rasterized into 3-plane (CMY) swaths and passed to the print engine for actual printing, such as by cyan, magenta, and yellow inkjet printheads. Other than the basic object definitions, the display list also receives certain attributes, such as foreground color, pattern and ROPs, that characterize the nature of the display list objects in its rendering process. These state change attributes are stored in the printer until a source object comes along which is to be affected by the state change. The state changes are enqueued in the display list prior to the objects they affect. Such display list formats are well known.

The instructions or states used in the preferred method are handled by the printer in the same way as, for example, a foreground color or a ROP, where all objects placed in the display list subsequent to a state change are acted upon by the state change instruction. Therefore, implementation of this invention requires little change in the overall operation of the printer electronics.

Figure 2:
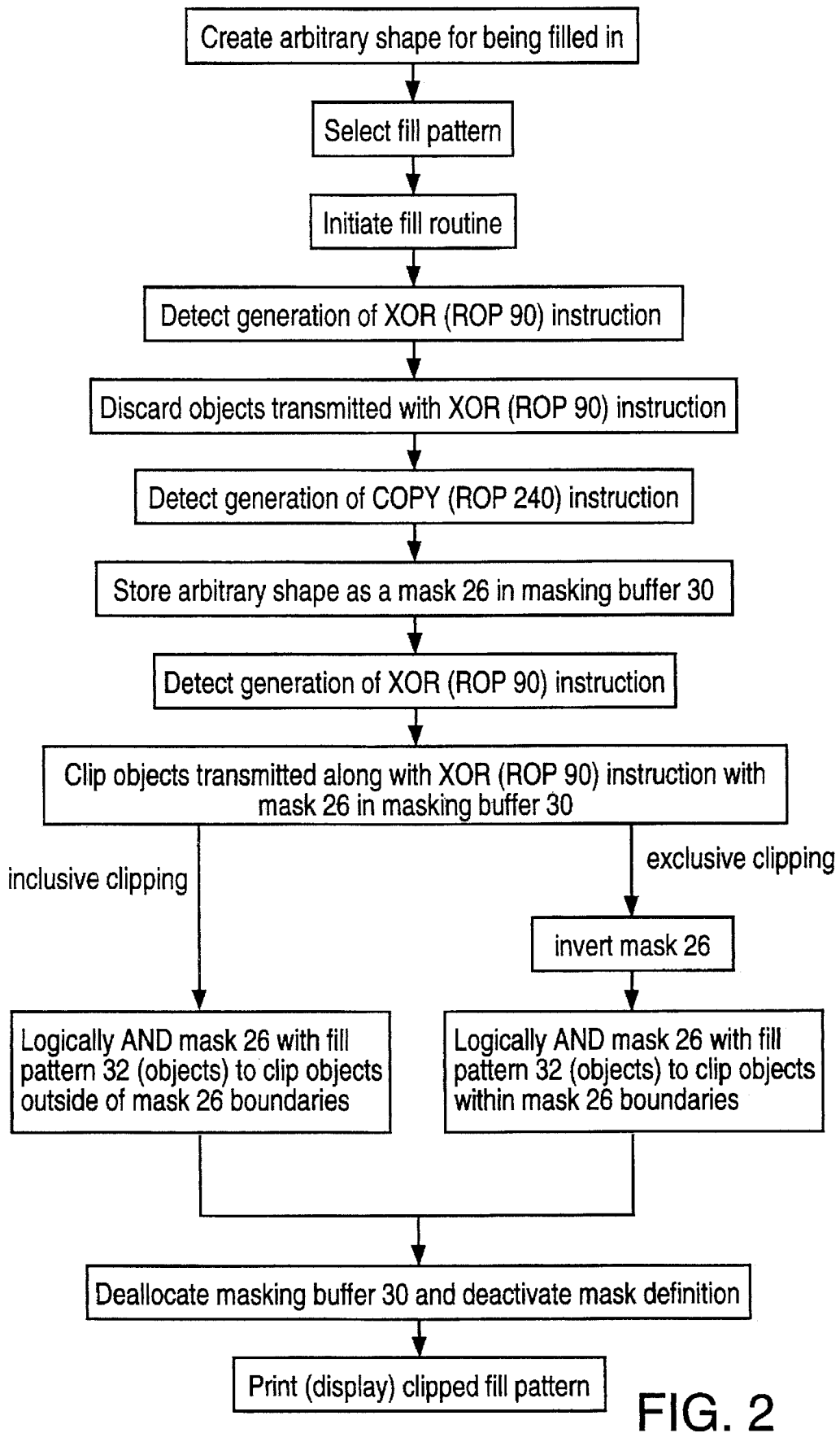
FIG. 2 is a flow chart of the basic steps used in the preferred embodiment method for filling in an arbitrary shape.

In the preferred process illustrated in FIG. 2, an original display background 22 (FIG. 3A) of any pattern or color is presumed. The user then creates an arbitrary shape for being filled in using a conventional application program and a graphical user interface. This step of creating an arbitrary shape may instead be performed automatically by an application program. The arbitrary shape to be filled may include text or a raster image. The user or application program then selects the fill pattern for the arbitrary shape and commands the computer to fill the arbitrary shape with the selected fill pattern. The fill pattern may be a solid color or a non-homogeneous pattern, such as a gradient or raster image. These above steps are conventional and well known.

Figure 1A:
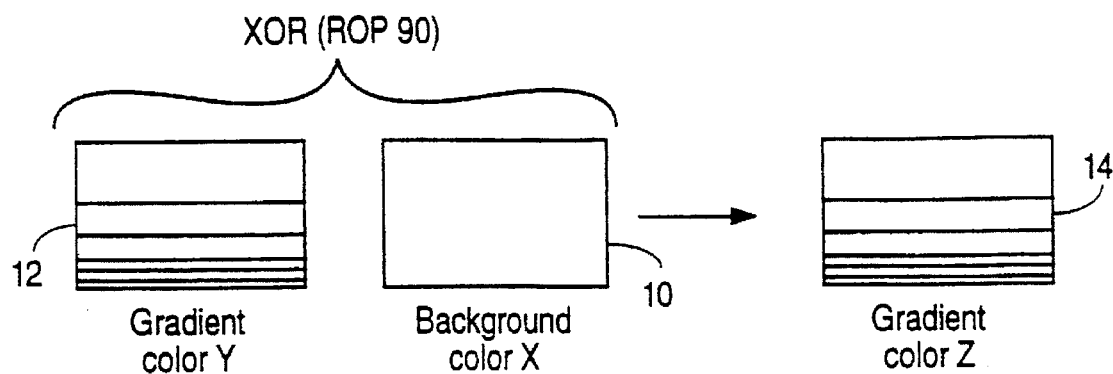
FIGS. 1A–1C illustrate the pertinent steps in a conventional three-step ROPs process for filling in an arbitrary shape with a fill pattern.

At this point, the application program will generate the first of the various ROP commands (ROP 90, ROP 240, ROP 90) described with respect to FIG. 1A in an attempt to instruct the printer to fill the arbitrary shape with the fill pattern. However, in accordance with one embodiment of this invention, the printer driver, which has been previously programmed into the host computer, detects the first instruction (ROP 90) from the application program. In response to this detection, the printer driver then discards all the objects (e.g., the fill pattern) that were sent with (or subsequent to) the XOR ROP 90 command. Thus, this fill pattern is not transmitted to the printer, and the first step shown in prior art FIG. 1A associated with the XOR ROP 90 command is not carried out by the printer. Therefore, the printer's memory does not have to store this information. In another embodiment, the XOR ROP 90 command and fill pattern are transmitted to the printer but are ignored by the printer.

Figure 1B:
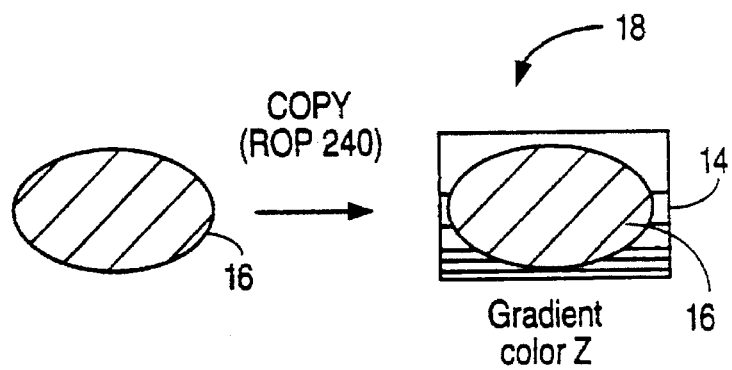
Figure 3A:
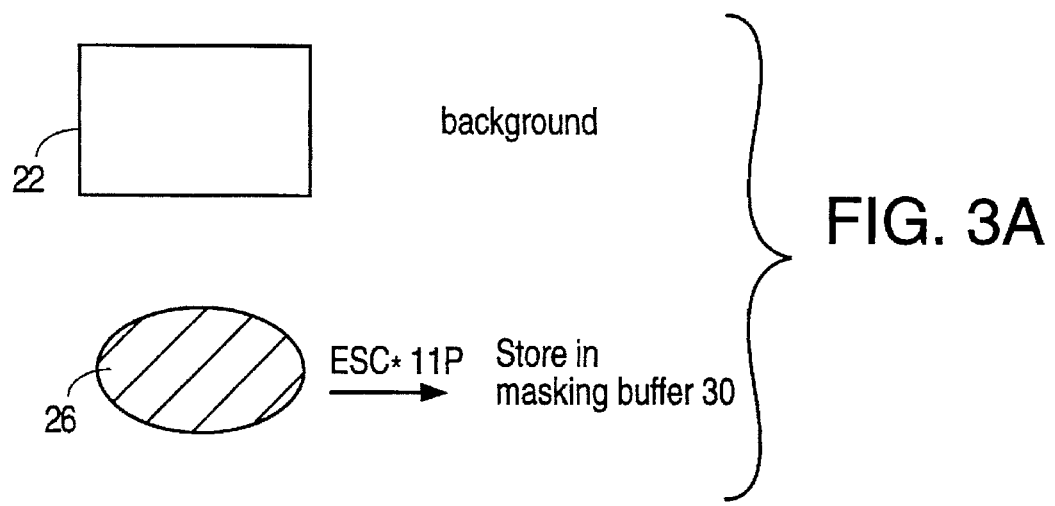
FIGS. 3A and 3B illustrate selected steps being carried out during the preferred process of FIG. 2.

The application program then generates the instructions for the second step in FIG. 1B, which is a mask copy command ROP 240. The printer driver intercepts this command and causes the escape sequence to enter the state of mask definition (ESC*11P). This mask definition instruction ESC*11P and the arbitrary mask 26 (FIG. 3) generated by the user are then transmitted to the printer. In response to this command ESC*11P, the printer places the mask 26 into a monochrome (single plane) masking buffer 30 (FIG. 4) at the printer resolution, as shown in FIG. 3A.

Any objects transmitted after the mask definition command will be stored in the masking buffer 30, so multiple objects (and even a raster image) may be stored. The mask 26 shape may be defined using any of the well known PCL-5C primitives (e.g., vectors, polygons, text, or 1-bit raster).

Figure 1C:
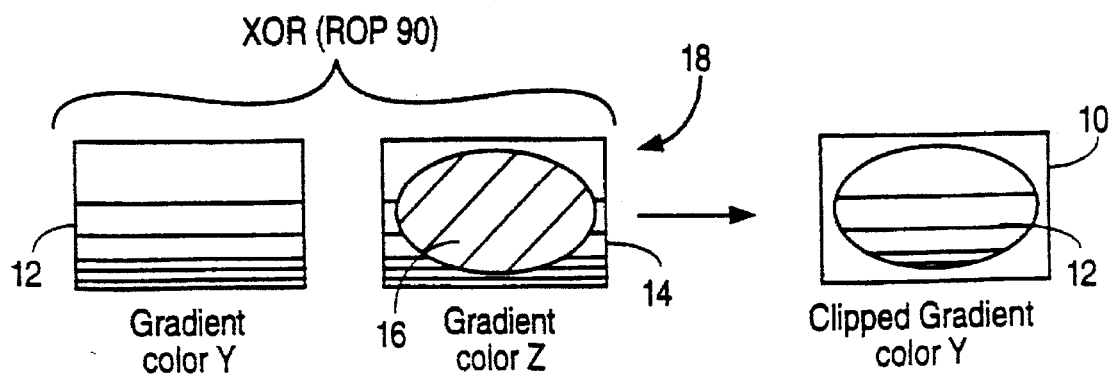

When the application program generates the third instruction in the conventional three-step ROP process of FIG. 1C, which is a repeat of the XOR ROP 90 step, the printer driver generates a mask clipping instruction ESC*12P. In this step, the mask 26 in the masking buffer 30 is logically ANDed with the fill pattern 32 (FIG. 3B) transmitted to the printer along with the ESC*12P instruction. This step will cause the transmitted fill pattern 32 to be clipped by the mask 26 and thereby take the shape of the mask 26. This is referred to as inclusive clipping. The resulting arbitrarily shaped fill pattern 34 (FIG. 3B) along with the original background 22 are then processed as a swath (if a display list is used) or stored in a frame buffer for later printing. If a display list is used, an image processor converts the data in the display list to a swath to be printed and transmits this swath of data to the print engine. The print engine then converts the swath to energization signals for the various pens used in the printer.

If it were desired to use the fill pattern to fill in objects external to the mask 26, the masking buffer 30 contents would first be inverted and then ANDed with the fill pattern 32 to clip all portions of the fill pattern 32 within the mask 26 boundaries. This is referred to as exclusive clipping. Hence, the arbitrary shape being filled is the portion of the display external to the mask.

In a next step, an instruction ESC*10P is transmitted, causing the masking buffer 30 to be deallocated and the mask definition to be deactivated. The masking buffer 30 no longer affects the incoming graphics data. Masking buffer 30 may form a portion of a larger memory within the printer. The monochrome masking buffer 30 only needs to be as large as a single swath. The swath size is at least as wide as the printing width for one scan of the printer. The swath size may be multiple printing widths and is selected based upon a number of well known tradeoffs including processing time and printing speed. An object (or multiple objects) to be displayed may thus be broken up into a number of swaths when processed, depending on the size of the object.

Figure 3B:
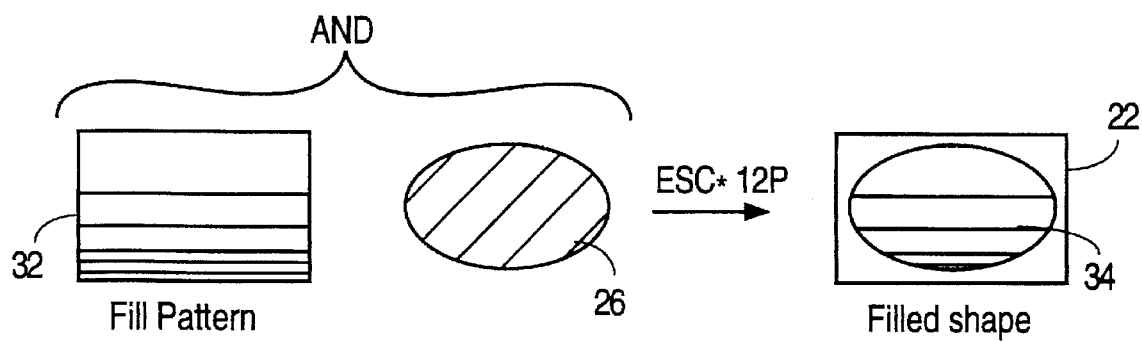

The resulting masked fill pattern 34 in FIG. 3B is thus identical to the arbitrarily shaped fill pattern 12 in FIG. 1C, but only two steps are used instead of the conventional three-step ROP process. Also, since the fill pattern is sent only once instead of twice, memory savings of up to 50% are achieved, and the processing time required before the printer may actually print the graphics is reduced significantly.

Instead of the ROP conversion process shown in FIG. 2, the arbitrary masking process may be directly carried out by an application program which uses the arbitrary masking process instead of the ROP process of FIGS. 1A-1C. In such a case, the escape routine described with respect to FIG. 2 is not utilized, even though the escape routine may still be available in the printer driver for use with other application programs.

Although the embodiment shown uses a printer to display the image, the display device may instead be a display screen or other device.

Figure 4:
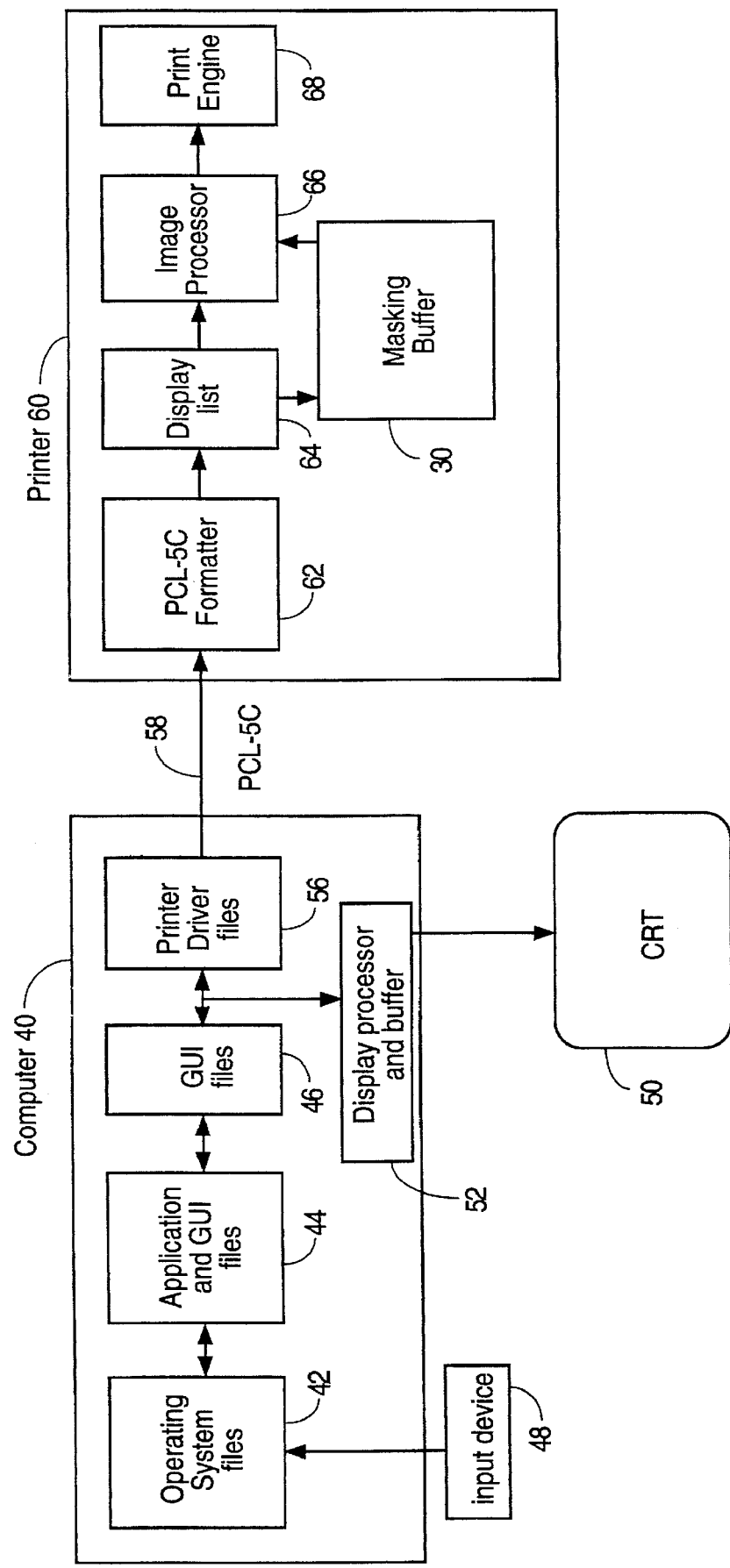
FIG. 4 is a block diagram of a computer and printer system used to carry out one embodiment of the invention.
Figure 5A:
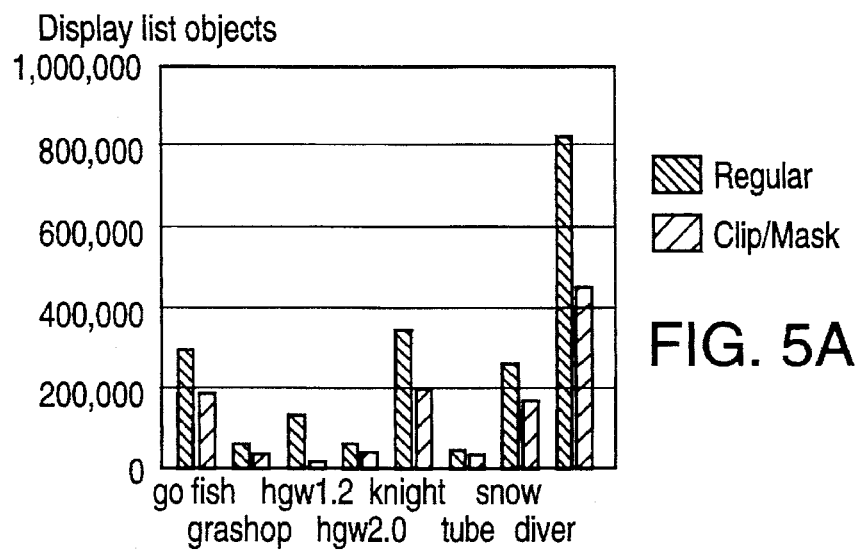
FIGS. 5A–5E are graphs comparing the processing speed and memory requirements of the preferred method to a conventional method.
Figure 5B:
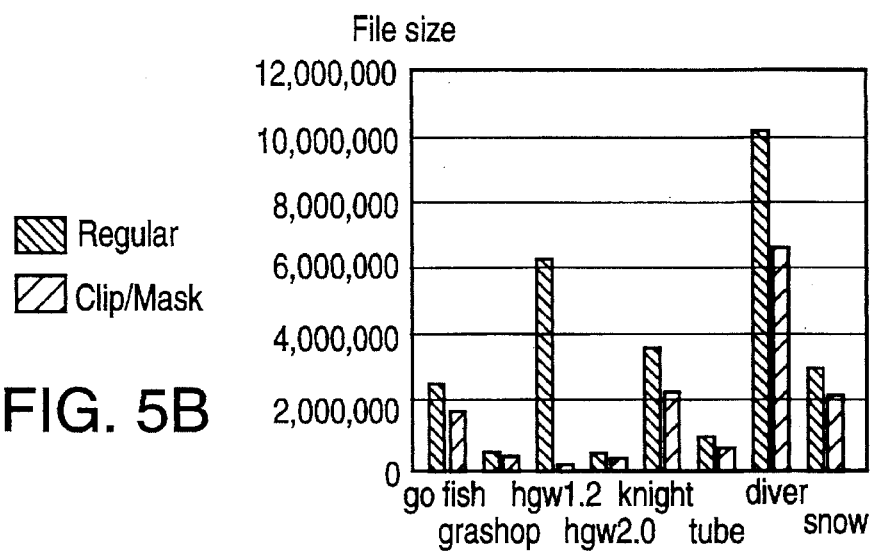
Figure 5C:
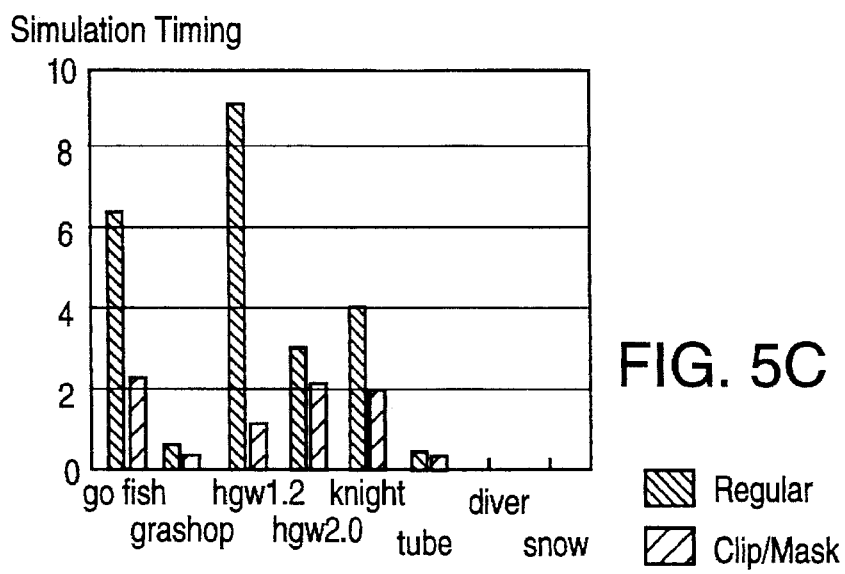
Figure 5D:
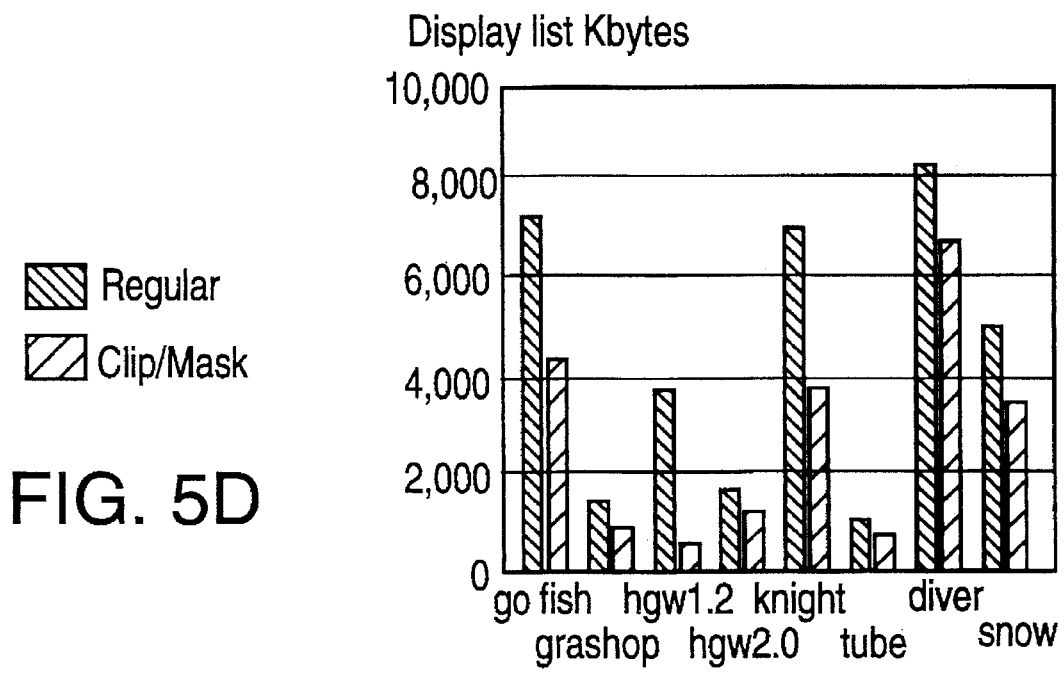
Figure 5E:
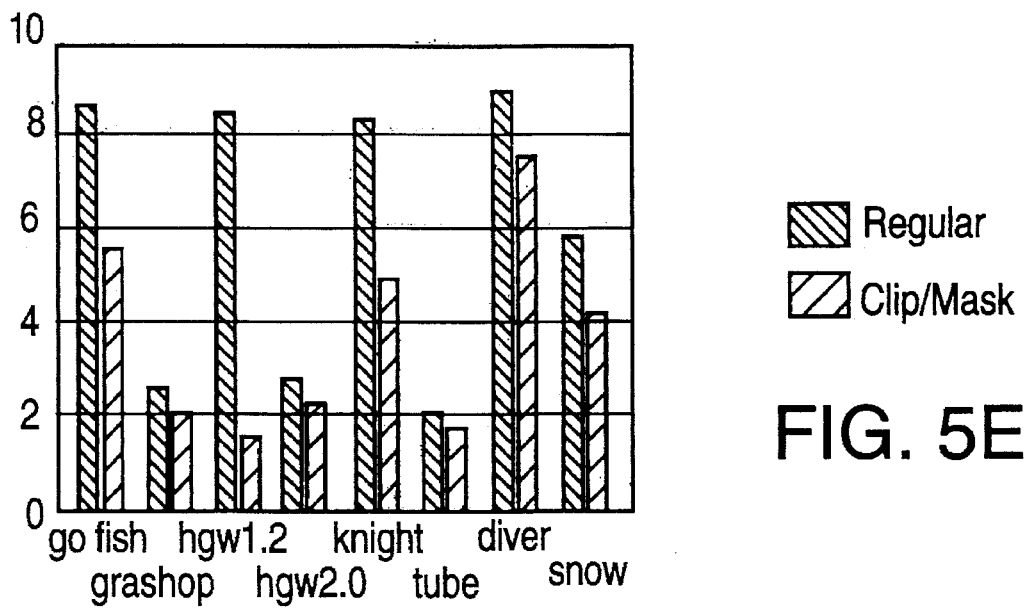

FIG. 4 is a simplified block diagram illustrating the various components of the preferred embodiment system. A conventional personal computer 40 is programmed with conventional operating system files 42 (such as MS-DOS), application files 44, graphical user interface (GUI) files (such as by Microsoft), and graphical device interface (GDI) files 46 (such as Windows by Microsoft). A conventional input device 48, such as a mouse or keyboard, as well as a conventional CRT 50 or other display screen, are connected to computer 40 in a conventional manner. The screen processor and frame buffer are shown in block 52.

Printer driver files 56 are also loaded into computer 40 to perform the conversion from the conventional ROP fill instructions to the arbitrary masking instructions described with respect to FIGS. 2 and 3 as well as to perform the conventional interface functions of a printer driver.

A cable 58 carries the PCL-5C data from the computer 40 to the printer 60. The PCL-5C data is then suitably formatted and parsed by PCL formatter 62. The processed data is stored in a display list 64.

The masking buffer 30, previously described, is used in conjunction with the display list 64 and the image processor 66 to generate rasterized black and three-plane CMY swaths. These swaths are passed on to the print engine 68 for printing. All components and functions not specifically addressed herein are well known and may be conventional, as is an inherent advantage of the present invention.

A printer in accordance with this invention may also utilize a conventional frame buffer and associated processing hardware instead of display list 64. The detailed construction of such a printer would be known to those skilled in the art.

Although the printer electronics are shown external to the computer 40, the printer electronics (or other display electronics) may be housed internal to the computer 40.

FIGS. 5A-5E compare the performance in processing speed and memory savings of the inventive clip/mask technique versus the conventional ROP process. As seen by the various graphs, the display list objects and file size is significantly reduced using the clip/mask technique, and the simulation timing for processing data using the clip/mask technique is significantly reduced from the ROP process timing.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for filling an arbitrary shape comprising the steps of:

designating an arbitrary shape for filling with a fill pattern;

detecting the generation of an exclusive OR (XOR) instruction for XORing said fill pattern with a display background and, in response to said step of detecting, causing said XOR instruction to not be carried out and said fill pattern to not be stored in a memory in a printer;

transmitting data representing said arbitrary shape to a receiver;

storing at least a portion of said arbitrary shape as a mask in a mask buffer;

transmitting said fill pattern to said receiver;

logically ANDing said mask in said mask buffer with said fill pattern to create a clipped fill pattern; and displaying said clipped fill pattern.

2. The method of claim 1 further comprising the step of inverting the contents of said mask buffer prior to said step of logically ANDing to perform exclusive clipping of said fill pattern.

3. The method of claim 1 wherein said fill pattern is a solid color.

4. The method of claim 1 wherein said fill pattern is non-homogeneous.

5. The method of claim 4 wherein said fill pattern is a gradient pattern.

6. The method of claim 4 wherein said fill pattern is a raster image.

7. The method of claim 1 wherein said arbitrary shape is a raster image.

8. The method of claim 1 wherein said receiver and said mask buffer are located within a printer communicating with a host computer.

9. The method of claim 1 wherein the steps of storing and logically ANDing are carried out by a printer receiving instructions from a host computer in a page description language.

10. The method of claim 1 wherein a printer driver program stored in a host computer converts instructions in a page description language, generated within said host computer, to converted instructions in said page description language for transmission to a printer, said converted instructions causing said printer to carry out said steps of storing and logically ANDing.

11. The method of claim 1 further comprising the following steps carried out after said step of detecting the generation of an XOR instruction, said steps comprising:

detecting the generation of a copy instruction by said host computer for copying said arbitrary shape onto a first pattern and, in response to said step of detecting the generation of said copy instruction, carrying out said step of transmitting data representing said arbitrary shape to a receiver.

12. The method of claim 11 further comprising the following steps carried out after said step of storing, said steps comprising:

detecting the generation of an XOR instruction by said host computer for XORing said fill pattern with said first pattern and, in response to said detecting the generation of said XOR instruction, carrying out said steps of transmitting said fill pattern to said receiver and logically ANDing said mask in said mask buffer with said fill pattern.

13. The method of claim 10 wherein said instructions generated by said host computer are originally generated by an application program running in said host computer prior to being converted by said printer driver program.

14. The method of claim 1 wherein said step of displaying said clipped fill pattern is performed by a printer.

15. The method of claim 1 wherein said step of displaying said clipped fill pattern is performed by a display screen.

16. The method of claim 1 wherein said receiver and mask buffer are housed in a color printer, and said masking buffer is a masking buffer having sufficient storing area for at least a swath of printed information across a medium in said printer.

17. A printing system comprising:

means for detecting the generation of an exclusive OR (XOR) instruction by a host computer for XORing a transmitted fill pattern with a display background and, in response to said step of detecting, causing said XOR instruction to not be carried out and said fill pattern to not be stored in a memory;

a receiver for receiving transmitted data and printing instructions from said host computer;

a mask buffer for storing at least a portion of a transmitted arbitrary shape as a mask;

a memory for storing a fill pattern for said arbitrary shape;

means for logically ANDing said mask in said mask buffer with said fill pattern to create a clipped fill pattern; and a printer for displaying said clipped fill pattern.

18. A system of claim 17 further comprising an invertor for inverting the contents of said mask buffer prior to logically ANDing said mask with said fill pattern to perform exclusive clipping of said fill pattern.

19. The system of claim 17 wherein said fill pattern is a solid color.

20. The system of claim 17 wherein said fill pattern is non-homogeneous.

21. The system of claim 17 wherein said fill pattern is a gradient pattern.

22. The system of claim 17 wherein said fill pattern is a raster image.

23. The system of claim 17 wherein said arbitrary shape is a raster image.

24. The system of claim 17 further comprising a display list for storing a description of a page to be printed.

25. The system of claim 17 further comprising a printer driver for converting a first set of filling steps generated by a host computer to a second set of filling steps for filling an arbitrary shape with a fill pattern.

* * * * *